US012809592B2

(12) United States Patent
Procopio et al.

(10) Patent No.: US 12,809,592 B2
(45) Date of Patent: Nov. 24, 2026

(54) USER-DEFINED SECURE REMOTE CODE EXECUTION FROM NO-CODE PLATFORMS

(71) Applicant: Google LLC, Mountain View, CA (US)

(72) Inventors: Michael Jeffrey Procopio, Boulder, CO (US); Preetham Mysore, Brooklyn, NY (US); Carlin Yuen, New York City, NY (US); Scott Haaland, Mountain View, CA (US); Christopher Hall, Broomfield, CO (US); Keith Einstein, Dix Hills, NY (US); Nicholas Eric Westbury, Seattle, WA (US)

(73) Assignee: Google LLC, Mountain View, CA (US)

( * ) Notice: Subject to any disclaimer, the term of this patent is extended or adjusted under 35 U.S.C. 154(b) by 282 days.

(21) Appl. No.: 17/644,282

(22) Filed: Dec. 14, 2021

(65) Prior Publication Data

US 2023/0185544 A1 Jun. 15, 2023

(51) Int. Cl.

*G06F 8/34* (2018.01)
*G06F 8/41* (2018.01)
*G06F 9/54* (2006.01)
*G06F 16/2455* (2019.01)

(52) U.S. Cl.

CPC ................ *G06F 8/34* (2013.01); *G06F 8/437* (2013.01); *G06F 9/547* (2013.01); *G06F 16/24565* (2019.01)

(58) Field of Classification Search

CPC ......................................................... G06F 8/34
See application file for complete search history.

(56) References Cited

U.S. PATENT DOCUMENTS

| | | | | |
|---|---|---|---|---|
| 8,418,064 B2 * | 4/2013 | Guagenti | .............. | H04W 40/24 715/744 |
| 10,466,981 B1 * | 11/2019 | MacMillan | ......... | G06F 9/45512 |
| 10,656,907 B2 | 5/2020 | Seolas et al. | | |

(Continued)

FOREIGN PATENT DOCUMENTS

| | | |
|---|---|---|
| CN | 108090035 A | 5/2018 |
| CN | 116414368 A | 7/2023 |

OTHER PUBLICATIONS

International Search Report and Written Opinion for the related Application No. PCT/US2022/081327, dated Mar. 17, 2023, 160 pages.

(Continued)

*Primary Examiner* — Jae U Jeon
(74) *Attorney, Agent, or Firm* — Shumaker & Sieffert, P.A.

(57) ABSTRACT

A method includes receiving a trigger interaction indication indicating a first graphical user interaction by a user within a no-code environment. In response to receiving the trigger interaction indication, the method also includes establishing a trigger condition for an application generated by the no-code environment. The method also includes receiving an action interaction indication indicating a second graphical user interaction by the user within the no-code environment. The method also includes, in response to receiving the action interaction indication, defining an action response for the application when the trigger condition is satisfied. The action response includes a function call calling a function of a script. The script is generated within a low-code environment. The method also includes executing the application.

24 Claims, 12 Drawing Sheets

(56) References Cited

U.S. PATENT DOCUMENTS

| | | | | |
|---|---|---|---|---|
| 11,163,960 | B2 | 11/2021 | Saha et al. | |
| 11,226,887 | B1 | 1/2022 | Sharifi Mehr | |
| 11,381,666 | B1 | 7/2022 | Stalioraitis et al. | |
| 11,870,741 | B2 | 1/2024 | John et al. | |
| 11,922,143 | B1 | 3/2024 | Shapiro et al. | |
| 12,079,584 | B2 | 9/2024 | Dua et al. | |
| 12,585,441 | B2 | 3/2026 | Procopio et al. | |
| 2003/0115142 | A1* | 6/2003 | Brickell | G07C 9/22 705/51 |
| 2004/0143816 | A1* | 7/2004 | Matsubayashi | H04N 21/8543 348/E5.103 |
| 2005/0102534 | A1* | 5/2005 | Wong | G06F 21/577 726/4 |
| 2006/0248406 | A1* | 11/2006 | Qing | G06F 8/31 714/38.14 |
| 2008/0040681 | A1 | 2/2008 | Synstelien et al. | |
| 2008/0052348 | A1 | 2/2008 | Adler et al. | |
| 2011/0197181 | A1* | 8/2011 | Muller | G06F 11/3672 717/127 |
| 2013/0024808 | A1* | 1/2013 | Rainisto | G06F 3/0488 715/810 |
| 2014/0067702 | A1 | 3/2014 | Rathod | |
| 2016/0210361 | A1* | 7/2016 | Pistoia | G06F 16/986 |
| 2016/0321222 | A1 | 11/2016 | Greenberg et al. | |
| 2016/0357373 | A1 | 12/2016 | Greenberg et al. | |
| 2018/0024814 | A1* | 1/2018 | Ouali | G06F 8/10 717/105 |
| 2018/0054464 | A1 | 2/2018 | Zhang et al. | |
| 2018/0107461 | A1 | 4/2018 | Balasubramanian et al. | |
| 2018/0219921 | A1 | 8/2018 | Baer et al. | |
| 2018/0285084 | A1* | 10/2018 | Mimlitch, III | G06F 11/3604 |
| 2019/0073197 | A1 | 3/2019 | Collins | |
| 2019/0268178 | A1 | 8/2019 | Fairweather et al. | |
| 2019/0391823 | A1* | 12/2019 | Jouhier | G06F 9/44505 |
| 2019/0394150 | A1 | 12/2019 | Denoue et al. | |
| 2020/0153750 | A1 | 5/2020 | Petys et al. | |
| 2020/0272114 | A1 | 8/2020 | Grabowski et al. | |
| 2020/0301678 | A1 | 9/2020 | Burman et al. | |
| 2020/0374244 | A1 | 11/2020 | John et al. | |
| 2021/0042094 | A1 | 2/2021 | Burman et al. | |
| 2021/0044546 | A1 | 2/2021 | Taslimi et al. | |
| 2021/0064349 | A1 | 3/2021 | Allgeier et al. | |
| 2021/0064685 | A1* | 3/2021 | Weizman | G06F 16/958 |
| 2021/0089618 | A1 | 3/2021 | Jain et al. | |
| 2021/0141616 | A1 | 5/2021 | Kane | |
| 2021/0141617 | A1* | 5/2021 | Burman | G06F 8/34 |
| 2021/0337249 | A1 | 10/2021 | Jain | |
| 2022/0060435 | A1 | 2/2022 | Whitten et al. | |
| 2022/0129257 | A1 | 4/2022 | Touati et al. | |
| 2022/0244925 | A1 | 8/2022 | Moss et al. | |
| 2022/0366147 | A1 | 11/2022 | Ho et al. | |
| 2022/0374209 | A1 | 11/2022 | Shek et al. | |
| 2022/0405068 | A1 | 12/2022 | Brown et al. | |
| 2023/0047090 | A1 | 2/2023 | Procopio et al. | |
| 2023/0107316 | A1 | 4/2023 | Ripa et al. | |
| 2023/0110941 | A1 | 4/2023 | Makhija et al. | |
| 2023/0125807 | A1 | 4/2023 | Ripa et al. | |
| 2023/0136289 | A1 | 5/2023 | Makhija et al. | |
| 2023/0214192 | A1 | 7/2023 | Makhija et al. | |
| 2023/0214193 | A1 | 7/2023 | Makhija et al. | |
| 2023/0224353 | A1 | 7/2023 | Magana | |
| 2023/0334395 | A1 | 10/2023 | Gorroño et al. | |
| 2023/0339102 | A1 | 10/2023 | Tapus et al. | |
| 2023/0393832 | A1 | 12/2023 | Touati et al. | |
| 2024/0231766 | A1 | 7/2024 | Ferreira et al. | |
| 2024/0256784 | A1 | 8/2024 | Harris et al. | |
| 2024/0272877 | A1 | 8/2024 | Girdhar | |
| 2024/0370234 | A1 | 11/2024 | Procopio et al. | |
| 2024/0412157 | A1 | 12/2024 | Manzano et al. | |
| 2025/0068396 | A1 | 2/2025 | Procopio et al. | |
| 2025/0315220 | A1 | 10/2025 | Procopio et al. | |

OTHER PUBLICATIONS

"AppSheet—Wikipedia", Wikipedia, 2023, 5 pp., Retrieved from the Internet on Nov. 17, 2025 URL: https://en.wikipedia.org/w/index.php?title=AppSheet&oldid=1163700647.

"Run your app in an iFrame on a web page—AppSheet Help", Google, 2022, 1 pp., Retrieved from the Internet on Nov. 17, 2025 from URL: https://web.archive.org/web/20220528202500/support.google.com/appsheet/answer/10104491.

"Send an email from an automation—AppSheet Help", Google, 2022, 10 pp., Retrieved from the Internet on Nov. 17, 2025 from URL: https://web.archive.org/web/20221104135615/https://support.google.com/appsheet/answer/11447614.

Avishahar-Zeira et al., "Could No. Code Be Code? Toward a No-Code Programming Language for Citizen Developers", Proceedings of the 2023 ACM SIGPLAN International Symposium on New Ideas, New Paradigms, and Reflections on Programming and Software, ACM, Oct. 19, 2023, 18 pp.

Elbatanony, Ahmed, and Giancarlo Succi. "Towards the no-code era: a vision and plan for the future of software development." Proceedings of the 1st ACM SIGPLAN International Workshop on Beyond Code: No Code. 2021. (Year: 2021) 7 pp.

First Examination Report from counterpart Indian Application No. 202447052104 dated Aug. 6, 2025, 8 pp.

Google for Developers, "Authenticate as a Google Chat app", Oct. 2022, 7 pp.

Google for Developers, "Build an HTTP Google Chat app", Oct. 2022, 6 pp.

Gwendal et al., "Xatkit: a multimodal low-code chatbot development framework", IEEE Access, vol. 8, Jan. 27, 2020, 15 pp.

Haile, "Implementing a Low-Code Al-Based Chatbot on Azure combined with Boomi Integration", Bachelor's Thesis, Haaga-Helia University of Applied Sciences, 2022, 72 pp.

International Preliminary Report on Patentability from International Application No. PCT/US2022/081327 dated Jun. 27, 2024, 9 pp.

Keisala, "Utilizing Large Language Models as No-code Interface in a Software Development Toolkit", Bachelor's Thesis, Jamk University of Applied Sciences, May 2023, 82 pp.

Lugovsky, "Low Code vs No Code: Full Analysis 2025", UI Bakery, Inc., Aug. 14, 2023, 15 pp.

Masili, "No-code development platforms: breaking the boundaries between IT and business experts", vol. 13, No. 1, International Journal of Economic Behavior (IJEB), Apr. 10, 2023, 17 pp.

Matt, "How To Create A Clickable Link To A Specific Record (for an AppSheet app)", MultiTech Visions, Mar. 16, 2023, 7 pp., Retrieved from the Internet on Nov. 24, 2025 from URL: https://www.multitechvisions.com/post/how-to-create-a-clickable-link-to-a-specific-record-for-an-appsheet-app.

O'Riordan et al., "It's All on the Table: Case Studies on Improved Workflow Management Using Airtable", Journal of archival organization, vol. 20, Nov. 1, 2023, 43 pp.

Picek, "Low-code/No-code Platforms and Modem ERP Systems", 2023 International Conference on Information Management (ICIM), IEEE, Mar. 17, 2023, 6 pp.

Response to Communication Pursuant to Rules 161(1) and 162 EPC dated Jul. 23, 2024, from counterpart European Application No. 22843601.0, filed Jan. 16, 2025, 18 pp.

Response to First Examination Report dated Aug. 6, 2025, from counterpart Indian Application No. 202447052104 filed Jan. 13, 2026, 7 pp.

Sahay, Apurvanand, et al. "Supporting the understanding and comparison of low-code development platforms." 2020 46th Euromicro Conference on Software Engineering and Advanced Applications (SEAA). IEEE, 2020. (Year: 2020) 8 pp.

Sufi, "Algorithms in Low-Code-No-Code for Research Applications: A Practical Review", Algorithms, Feb. 13, 2023, 23 pp.

Talesra et al., "Low-Code Platform for Application Development", International Journal of Applied Engineering Research, vol. 16, No. 5, May 31, 2021, 6 pp.

Weber, Irene. "Low-code from frontend to backend: Connecting conversational user interfaces to backend services via a low-code IoT platform." Proceedings of the 3rd Conference on Conversational User Interfaces. 2021. (Year: 2021) 5 pp.

(56) References Cited

OTHER PUBLICATIONS

Gordon, "Power Automate + Adaptive Cards introduces business form scenarios on Microsoft Teams", Jan. 10, 2020, 9 pp., https://www.microsoft.com/en-us/power-platform/blog/power-automate/power-automate-adaptive-cardsintroduces-business-form-scenarios-on-microsoft-teams/.

Infosys, "Low Code, No Code: Transforming Digital Platform Development", https://www.infosys.com/about/knowledge-institute/documents/low-code-No. code-secured.pdf, 2020, 24 pp., (Applicant points out, in accordance with MPEP 609.04(a), that the year of publication, 2020, is sufficiently earlier than the effective U.S. filing date, so that the particular month of publication is not an issue. ).

Wiggers, "Slack gains new automation features, including conditional logic for workflows", Sep. 1, 2022, 8 pp., https://techcrunch.com/2022/09/01/slack-gains-new-automation-features-including-conditional-logic-forworkflows/.

Communication pursuant to Article 94(3) EPC from counterpart European Application No. 22843601.0 dated Jul. 16, 2026, 6 pp.

* cited by examiner

USER-DEFINED SECURE REMOTE CODE EXECUTION FROM NO-CODE PLATFORMS

TECHNICAL FIELD

This disclosure relates to user-defined secure remote code execution from no-code platforms.

BACKGROUND

No-code development platforms allow programmers and non-programmers to create application software via graphical user interfaces as opposed to conventional programming techniques. Thus, no-code platforms enable business technologists and citizen developers of all skill levels to build power applications and workflows for their organizations without the need to write any code. While these no-code platforms are often powerful and expressive, they have limited capabilities. For example, conventional no-code platforms struggle with advanced functionality such as tying into existing code modules of business logic and/or calling external services.

SUMMARY

One aspect of the disclosure provides a method for user-defined secure remote code execution from no-code platforms. The method, when executed by data processing hardware causes the data processing hardware to perform operations. The operations include receiving a trigger interaction indication indicating a first graphical user interaction by a user within a no-code environment. The operations also include, in response to receiving the trigger interaction indication, establishing a trigger condition for an application generated by the no-code environment. The operations include receiving an action interaction indication indicating a second graphical user interaction by the user within the no-code environment. In response to receiving the action interaction indication, the method includes defining an action response for the application when the trigger condition is satisfied. The action response includes a function call calling a function of a script. The script is generated within a low-code environment. The operations include executing the application.

Implementations of the disclosure may include one or more of the following optional features. In some implementations, the second graphical user interaction includes selecting the function of the script from a plurality of functions of the script. In some of these implementations, each script of the plurality of functions is generated within the low-code environment.

In some examples, the operations further include, after receiving the action interaction indication, receiving, from the low-code environment, one or more parameters associated with the function of the script, receiving, from the low-code environment, data type information for at least one of the one or more parameters, and, for each respective parameter of the one or more parameters, querying the user for an expression that, when evaluated, satisfies the respective parameter. In some of these examples, the function call calls the function of the script using an evaluation of the expression for each respective parameter.

Optionally, the application is associated with a first set of permissions, the script is associated with a second set of permissions, and the second set of permissions different than the first set of permissions. The operations may further include determining the second set of permissions, requesting, from the user, approval for the second set of permissions, and receiving, from the user, permissions approval approving the second set of permissions.

In some implementations, while the application is executing, the application determines whether the trigger condition has been satisfied. The application may also, when the trigger condition has been satisfied, call, using the function call, the function of the script and receive, from the function, a result comprising an execution status and a data response. In some implementations, the data response includes a structured data response that includes one or more fields and type information for at least one field of the one or more fields. In some examples, the application, based on the result, calls a second function. While the application is executing, the application may further use the received data response as an input to a process. The application may call the function via an application programming interface (API). Executing the application may include deploying the application for a second user, the second user different than the user.

Another aspect of the disclosure provides a system for providing user-defined secure remote code execution from no-code platforms. The system includes data processing hardware and memory hardware in communication with the data processing hardware. The memory hardware stores instructions that when executed on the data processing hardware cause the data processing hardware to perform operations. The operations include receiving a trigger interaction indication indicating a first graphical user interaction by a user within a no-code environment. The operations also include, in response to receiving the trigger interaction indication, establishing a trigger condition for an application generated by the no-code environment. The operations include receiving an action interaction indication indicating a second graphical user interaction by the user within the no-code environment. In response to receiving the action interaction indication, the method includes defining an action response for the application when the trigger condition is satisfied. The action response includes a function call calling a function of a script. The script is generated within a low-code environment. The operations include executing the application.

This aspect may include one or more of the following optional features. In some implementations, the second graphical user interaction includes selecting the function of the script from a plurality of functions of the script. In some of these implementations, each script of the plurality of functions is generated within the low-code environment.

In some examples, the operations further include, after receiving the action interaction indication, receiving, from the low-code environment, one or more parameters associated with the function of the script, receiving, from the low-code environment, data type information for at least one of the one or more parameters, and, for each respective parameter of the one or more parameters, querying the user for an expression that, when evaluated, satisfies the respective parameter. In some of these examples, the function call calls the function of the script using an evaluation of the expression for each respective parameter.

Optionally, the application is associated with a first set of permissions, the script is associated with a second set of permissions, and the second set of permissions different than the first set of permissions. The operations may further include determining the second set of permissions, requesting, from the user, approval for the second set of permissions, and receiving, from the user, permissions approval approving the second set of permissions.

In some implementations, while the application is executing, the application determines whether the trigger condition has been satisfied. The application may also, when the trigger condition has been satisfied, call, using the function call, the function of the script and receive, from the function, a result comprising an execution status and a data response. In some implementations, the data response includes a structured data response that includes one or more fields and type information for at least one field of the one or more fields. In some examples, the application, based on the result, calls a second function. While the application is executing, the application may further use the received data response as an input to a process. The application may call the function via an application programming interface (API). Executing the application may include deploying the application for a second user, the second user different than the user.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

No-code development platforms allow programmers and non-programmers to create application software via graphical user interfaces as opposed to conventional programming techniques. For example, using graphical representations, a no-code environment can allow a user to easily create an "if-this-then-that" automation that triggers on conditional events. Thus, no-code platforms enable business technologists and citizen developers of all skill levels to build power applications and workflows for their organizations without the need to write any code. While these no-code platforms are often powerful and expressive, they have limited capabilities. For example, conventional no-code platforms struggle with advanced functionality such as tying into existing code modules of business logic and/or calling external services.

In contrast to no-code environments, which allow for the programming of applications with no coding whatsoever, low-code environments provide an environment that allows a user the ability to perform some manual coding and scripting while also including visual-based drag and drop elements. That is, low-code environments offer a middle-ground between a no-code environment (i.e., where the user performs no coding) and a pro-code environment (i.e., a traditional fully manual coding environment). Low-code environments are often extensible and offer open application programming interfaces (APIs) to allow interconnectivity and interoperability with other environments.

Implementations herein include systems and methods for user-defined secure remote code execution from a no-code environment. In some examples, a secure remote execution controller allows a user to interact with a no-code environment. In some additional examples, via graphical interactions from the user, the secure remote execution controller establishes a trigger condition for an application generated by the no-code environment. The secure remote execution controller, via additional graphical interactions from the user, defines an action response to the trigger. The action response includes executing a task. For example, the task is sending an email or saving data. In some implementations, the task includes calling a function of a script where the script has been generated via a low-code environment or a pro-code environment. Thus, the secure remote execution module offers a bridge between no-code environments and low-code (or pro-code) environments to provide additional extensibility and automation. Such extensibility enables a wide range of user cases, such as automatically interfacing with a user's calendar to create appointments, reading or writing from an external data source, calling an external machine learning service, etc.

Figure 1:
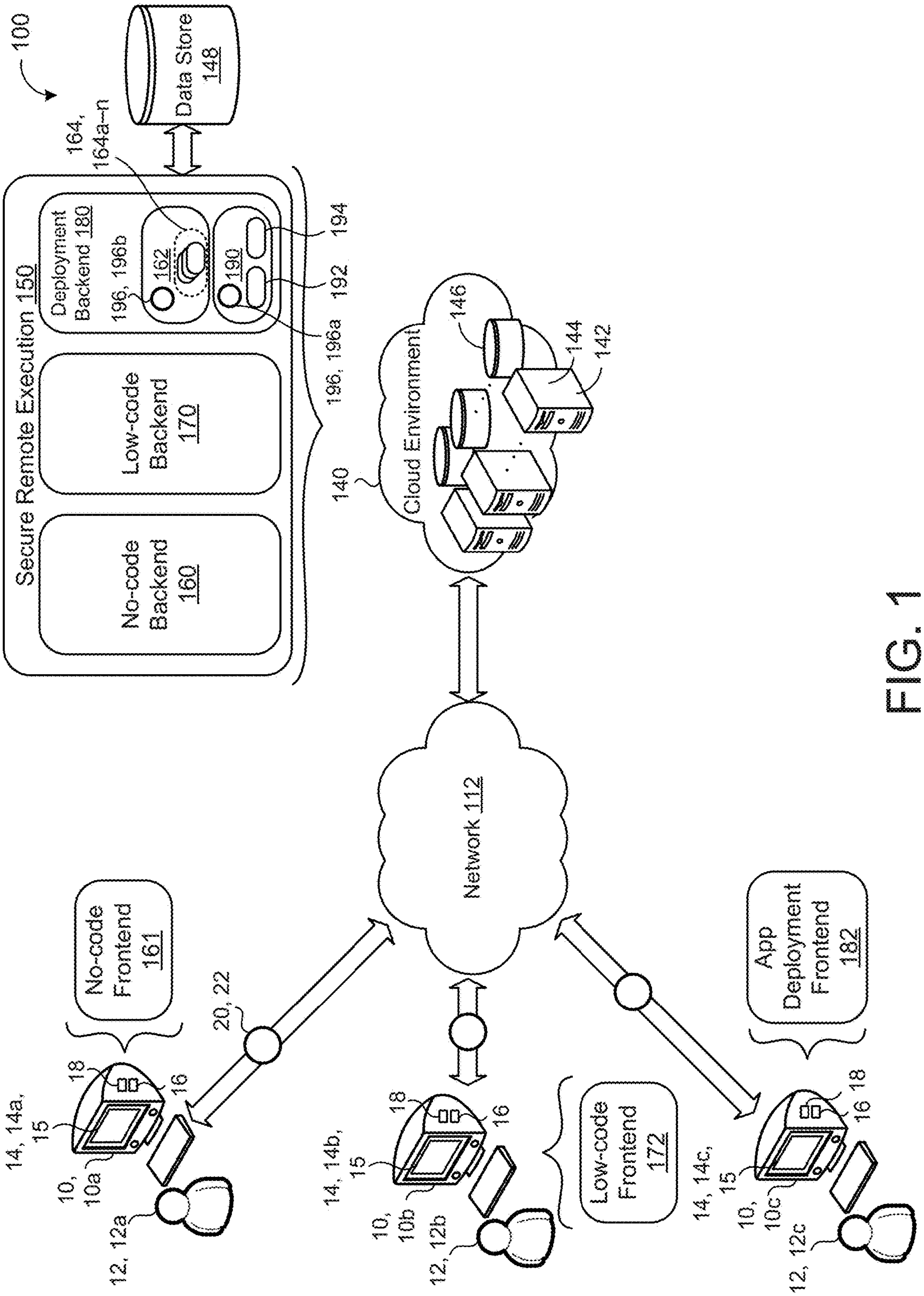
FIG. 1 is a schematic view of an example system for providing user-defined secure remote code execution from no-code platforms.

Referring to FIG. 1, in some implementations, a remote code execution system 100 includes a remote system 140 in communication with one or more user devices 10 each associated with a respective user 12 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 148 (i.e., a remote storage device) may be overlain on the storage resources 146 to allow scalable use of the storage resources 146 by one or more of the clients (e.g., the user device 10) or the computing resources 144.

The remote system 140 is configured to communicate with the user devices 10 via, for example, the network 112. The user device(s) 10 may correspond to any computing device, such as a desktop workstation, a laptop workstation, or a mobile device (i.e., a smart phone). Each user device 10 includes computing resources 18 (e.g., data processing hardware) and/or storage resources 16 (e.g., memory hardware). The data processing hardware 18 executes a graphical user interface (GUI) 14 for display on a screen 15 in communication with the data processing hardware 18.

The remote system 140 executes a secure remote execution controller 150. The remote execution controller 150 includes a no-code backend 160. A first user 12, **12*a* may communicate with the no-code backend 160 via, for example, a first user device 10, 10*a* and a no-code frontend 161 provided by the no-code backend 160. For example, the user 12*a* interacts with the no-code frontend 161 using a first GUI 14, 14*a* displayed on the screen 15. The combination of the no-code backend 160 and the no-code frontend 161 comprise a no-code environment. As discussed in more detail below, the GUI 14***a* provided by the no-code backend 160 may be a web-based GUI 14 (e.g., accessed via a web browser) and provides the user 12*a* with an interactive, visual workspace to build, execute, and publish no-code applications 190. In other examples, the no-code frontend 161 is executed by an application executing on the first user device 10*a*. The GUI 14*a* allows the user 12*a* to drag and drop application routines or sub-routines into an editing area where they may be connected to form an application 190. Notably, the user 12 does not require programming skills to generate the application 190. For example, the user 12*a* selects one or more trigger conditions 192 (i.e., events such as a row being added to a database) and action responses 194 (e.g., sending a notification) that the application 190 executes in response to a trigger condition 192 being satisfied. The application 190 may interact with data stored at the data store 148. For example, the application 190 may monitor for changes within data stored at the data store 148 for the trigger condition 192 and/or modify data stored at the data store 148 for the action response 194. The user 12*a* may select a data source for the application 190. For example, the user 12*a* directs the remote execution controller 150 to one or more data elements (e.g., tables, databases, etc.) stored at the data store 148 when generating the application 190. The application 190 may support many different use cases, such as email automation (e.g., sending customized messages to internal or external users), creating invoices/decks/reports (e.g., generating files at a specified location using templated content), connecting services (e.g., send/return data from external services), and/or scheduling automated data manipulation/logic (e.g., run advanced business logic on data).

In some examples, the remote execution controller 150 receives a trigger interaction indication 20 indicating a graphical user interaction with the GUI 14 by the user 12*a* via the no-code frontend 161 (i.e., within the no-code environment). In response to receiving the trigger interaction indication 20, the remote execution controller 150 establishes a trigger condition 192 for the application 190 generated by the no-code environment 160, 161. The remote execution controller 150 also receives an action interaction indication 22 indicating another graphical user interaction with the GUI 14 by the user 12*a* via the no-code frontend 161. In response to receiving the action interaction indication 22, the remote execution controller 150 defines an action response 194 for the application 190 when the trigger condition 192 is satisfied. That is, as described in more detail below, the action response 194 defines a behavior of the application 190 when the trigger condition 192 is satisfied. For example, when the trigger condition 192 is that a value within a table is changed, the action response 194 for the application 190 is to generate a notification to a user 12. The user 12*a* may publish or otherwise deploy the application 190 (e.g., via an application deployment backend 180 and/or an application deployment frontend 182) such that the remote execution controller 150 executes the application 190.

Figure 2A:
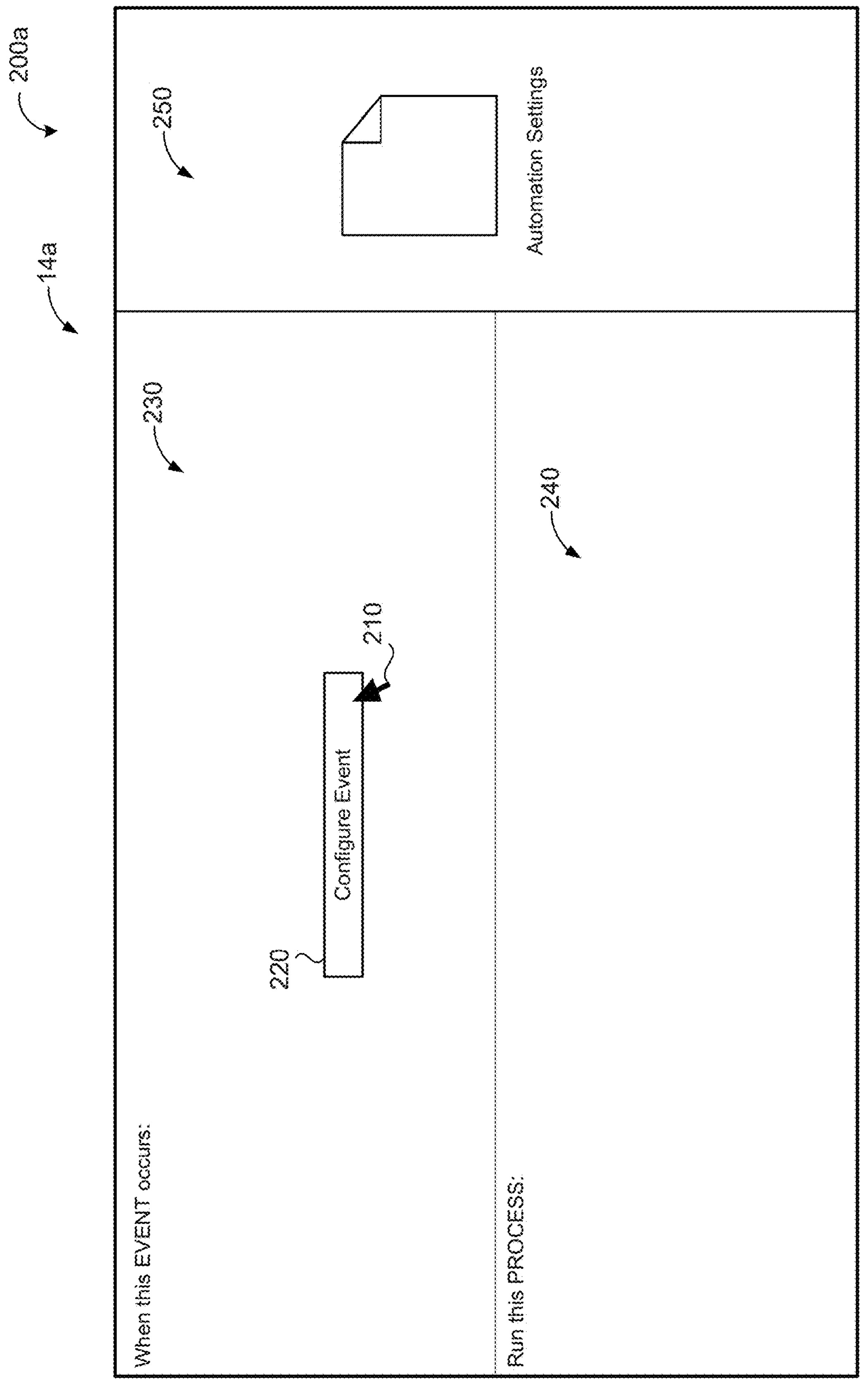
FIGS. 2A and 2B are schematic views of example user interactions with a no-code environment.

Referring now to FIG. 2A, a schematic view 200*a* includes an exemplary GUI 14 displayed on the screen 15 of the first user device 10*a* when the user 12 is interacting with the no-code frontend 161 provided by the no-code backend 160 to create an application 190. Here, the GUI 14 is split into an event pane 230, a run pane 240, and a settings pane 250. The event pane 230 displays a graphical representation of a configure event user input 220 (i.e., a button). The configure event user input 220 allows the user 12 to configure an event (i.e., a trigger condition 192) for the application 190. The user 12, via a graphical user interaction, sends the trigger interaction indication 20 to the remote execution controller 150. For example, the user 12 selects the configure event user input 220 with a cursor 210 (e.g., via a mouse, keyboard, touchscreen, voice commands, or any other user input). In the example of schematic view 200*b* (FIG. 2B), the user 12, via interactions with the configure event user input 220 (FIG. 2A), establishes the trigger condition 192. Here, the configure event user input 220 transforms into a trigger identification element 222 that graphically informs the user 12 that the trigger condition 192, in this example, corresponds to when a new information record is created. The remote execution controller 150 automatically generates or populates any code necessary for the application 190 to implement the trigger condition 192 without requiring the user 12 to do any manual programming.

Referring back to FIG. 1, in some implementations, the secure remote execution controller 150 includes a low-code environment that includes a low-code backend 170 and a low-code frontend 172. A second user 12, 12*n* may communicate with the low-code backend 170 via, for example, a second user device 10, 10*b* and the low-code frontend 172 provided by the low-code backend 170. For example, the user 12*b* interacts with the low-code frontend 172 using a second GUI 14, 14*b* displayed on the screen 15. The combination of the low-code backend 170 and the low-code frontend 172 comprises a low-code environment. Like the first GUI 14*a*, the second GUI 14*b* provided by the low-code backend 170 may be a web-based GUI 14 (e.g., accessed via a web browser) and provides the user 12*b* with an interactive, visual workspace to build, execute, and publish low-code applications, scripts 162, and/or functions 164, 164*a-n* of the scripts 162. The low-code environment (i.e., the low-code backend 170 and low-code frontend 172) differs from the no-code environment in that the low-code environment provides access to manual coding techniques (e.g., scripts) that allow for more complex and sophisticated behavior with the tradeoff of requiring some knowledge or expertise with the manual coding techniques. In some examples, the low-code environment is instead a pro-code environment (i.e., a traditional coding environment that relies on minimal, if any, visual representations).

Figure 6:
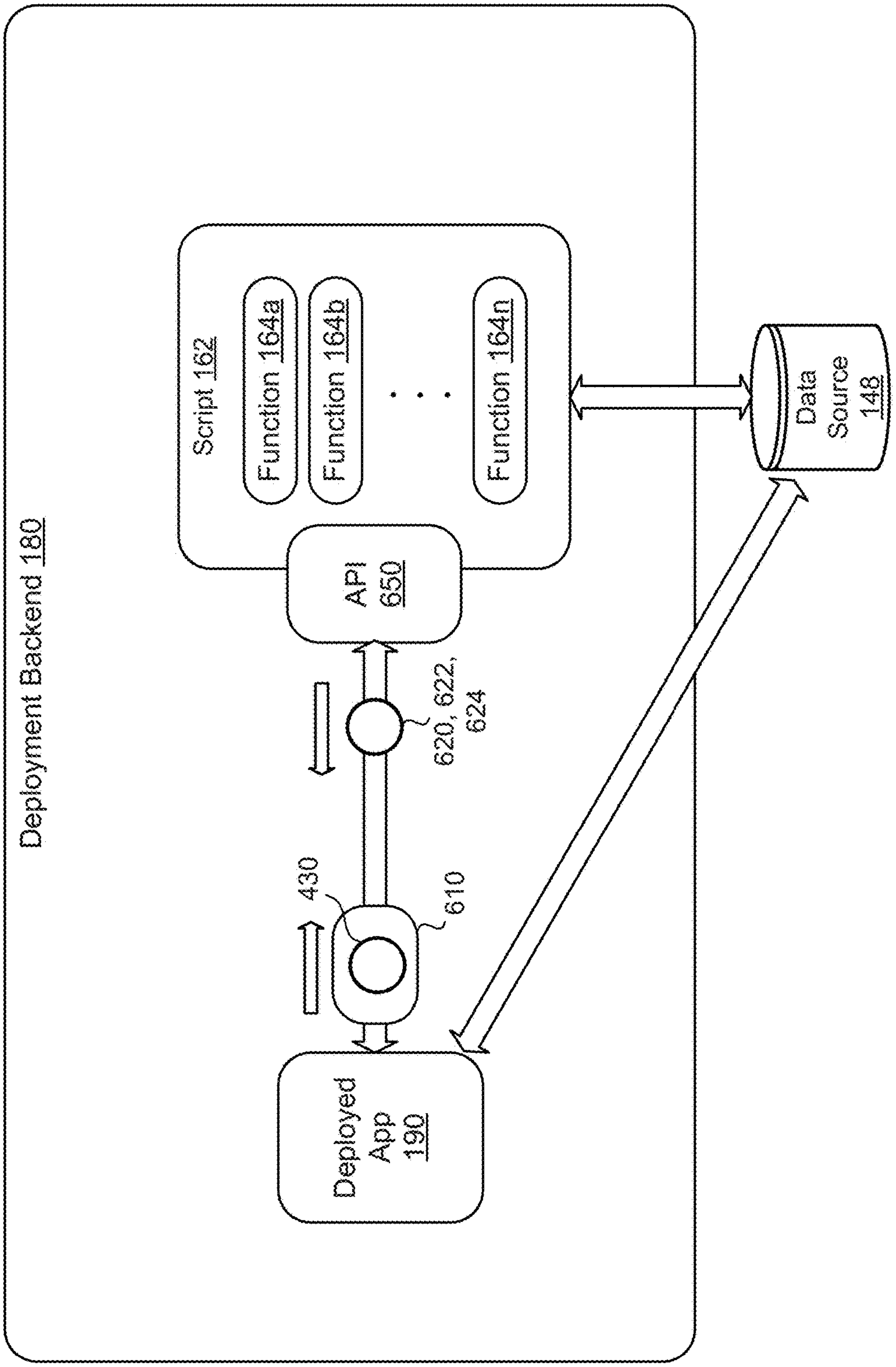
FIG. 6 is a schematic view of exemplary components of the system of FIG. 1.

The second user 12*b*, using the low-code environment, authors or generates one or more scripts 162 using a scripting language (e.g., JavaScript, Python, Lua, etc.). Each script 162 includes one or more functions 164. Each function 164 is a block of code designed to perform a particular task. For example, the task includes reading/writing custom data and/or reports to a particular data store, connecting and passing data to external services, and otherwise executing more advanced business logic. Each function 164 is executed when called or invoked. The second user 12*b*, which may be a different user than the first user 12*a* (e.g., a user 12 with more experience or skill in manually coding techniques) or the same user 12 as the first user 12*a*, publishes or otherwise deploys the script 162 via the remote execution controller 150. For example, the application deployment backend 180 exposes the script 162 to external programs and services via the API 650 (FIG. 6). In this way, the scripts 162 authored by the second user 12*b* are available to any number of applications 190 authored by any number of other users 12. That is, the scripts can be called (i.e., reused) by any number of applications 190.

In some examples, in response to receiving the action interaction indication 22, the no-code backend 160 defines the action response 194 that includes a function call calling a function 164 of a script 162 generated within the low-code environment 170, 172. This configures the application 190, when executing, to call a function 184 authored by user 12*b* who may be different than the user 12*a*. Thus, the user 12*a* may leverage the manually coding expertise of the user 12*b* to provide additional sophistication to the application 190 without personally needing coding expertise.

Figure 2B:
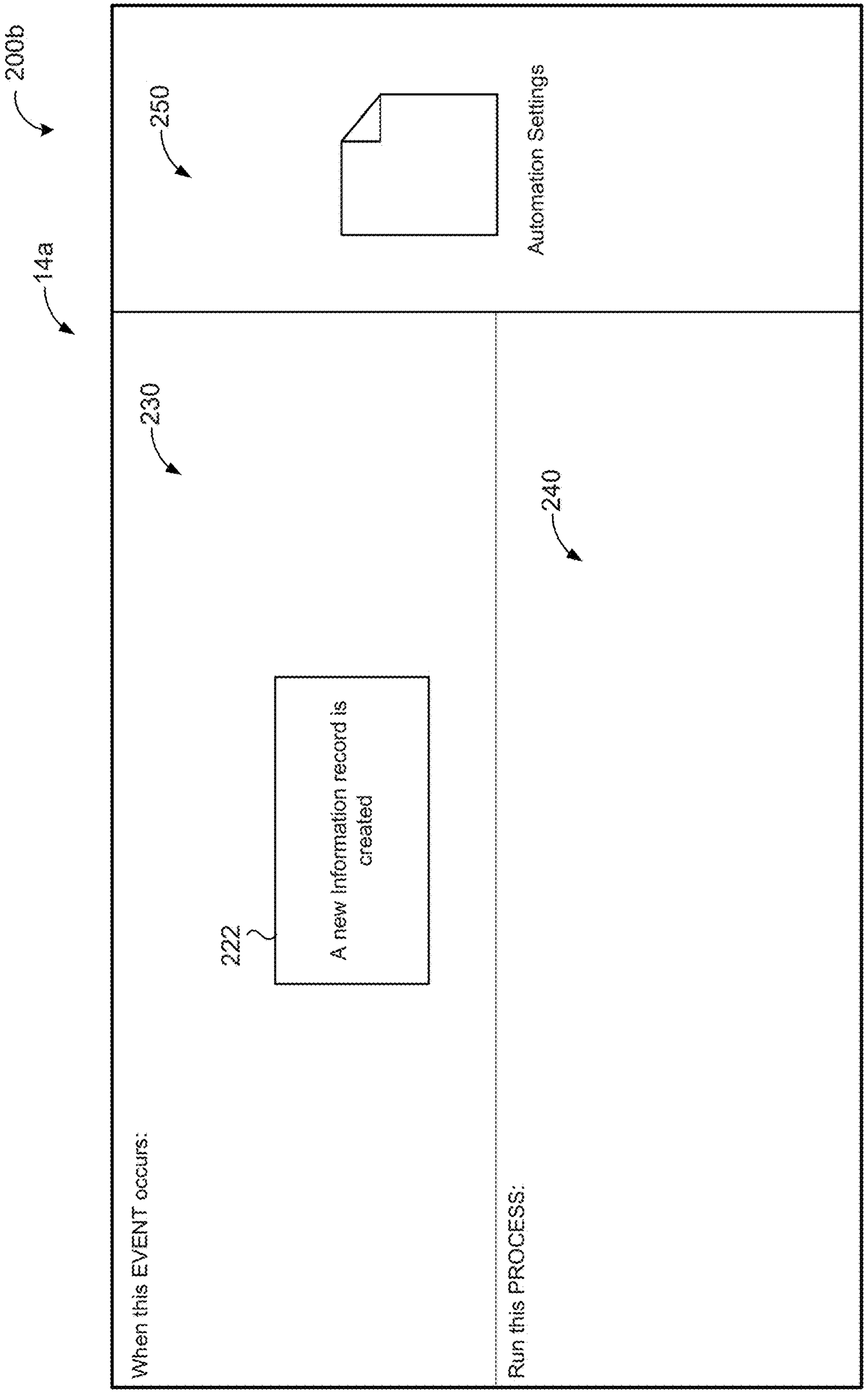
Figure 3A:
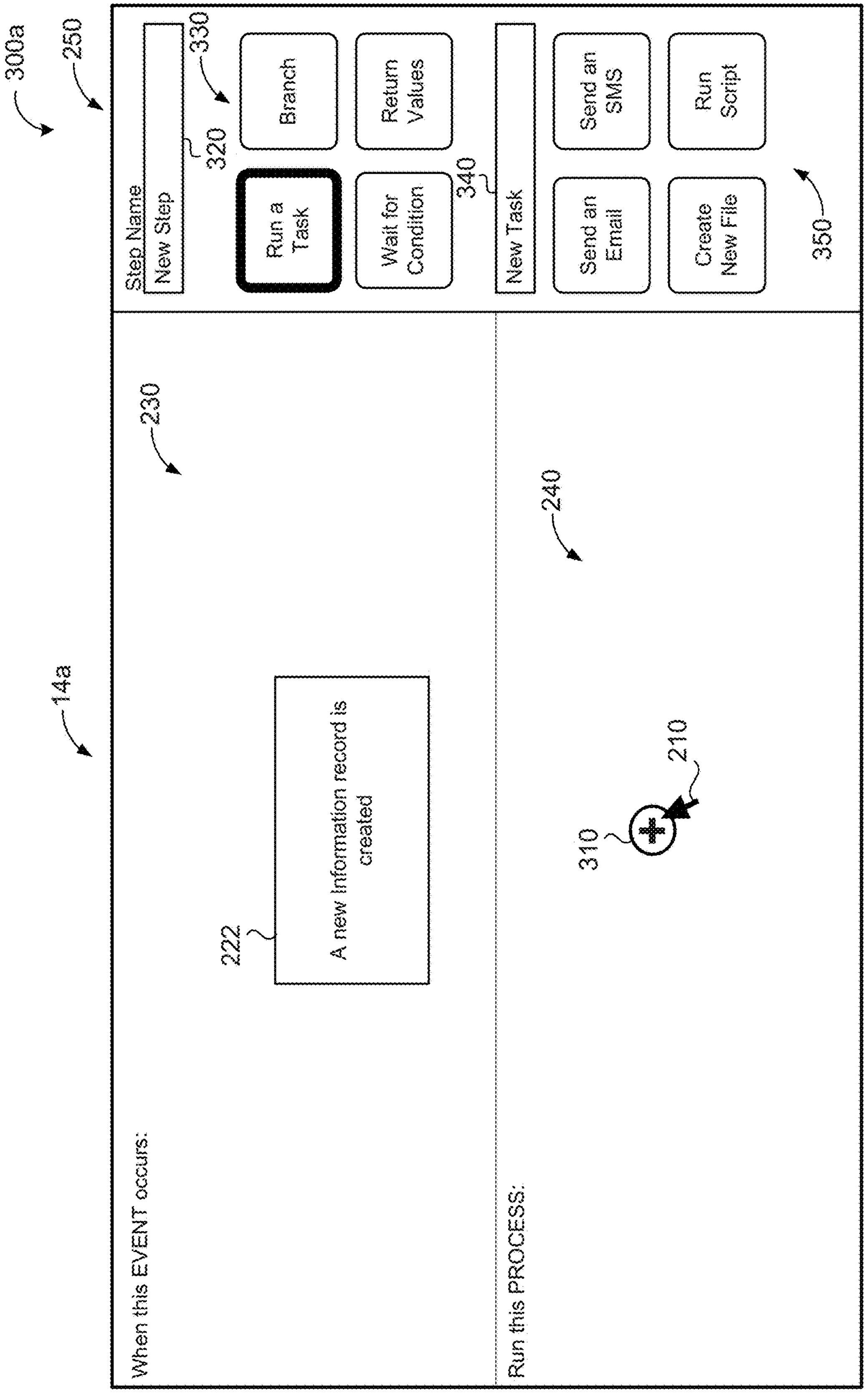
FIGS. 3A-3C are schematic views of additional example user interactions with the no-code environment.

Referring now to FIG. 3A, schematic view 300*a* continues the example illustrated in FIGS. 2A and 2B. Here, the run pane 240 includes an add step indication 310 that, when interacted with by the user 12*a* (e.g., via the cursor 210) populates the settings pane 250 with options for configuring the access response 194 to the trigger condition(s) 192 illustrated within the event pane 230. In this example, the user 12*a* provides an interaction indication indicating an interaction with the add step indication 310 (i.e., the "+" user input) that populates the settings pane 250 with options such as a step name text field 320 that allows the user 12*a* to uniquely name the access response 194 (i.e., the "step" in response to the "event" or trigger condition 192). The settings pane 250 also includes step options 330 that broadly define an action for the action response 194. Here, the options include "Run a Task," "Branch," "Wait for Condition," and "Return Values."

In this example, the user 12*a* has selected "Run a Task" which results in the GUI 14*a* providing additional options further defining the action response 194. Here, the user 12*a* is offered a task name text field 340 that allows the user 12*a* to uniquely name a task or operation of the action response 194. The user 12*a* is also provided with multiple task options 350. Here, the task options 350 include "Send an Email," "Send an SMS," "Create New File," and "Run Script."

Figure 3B:
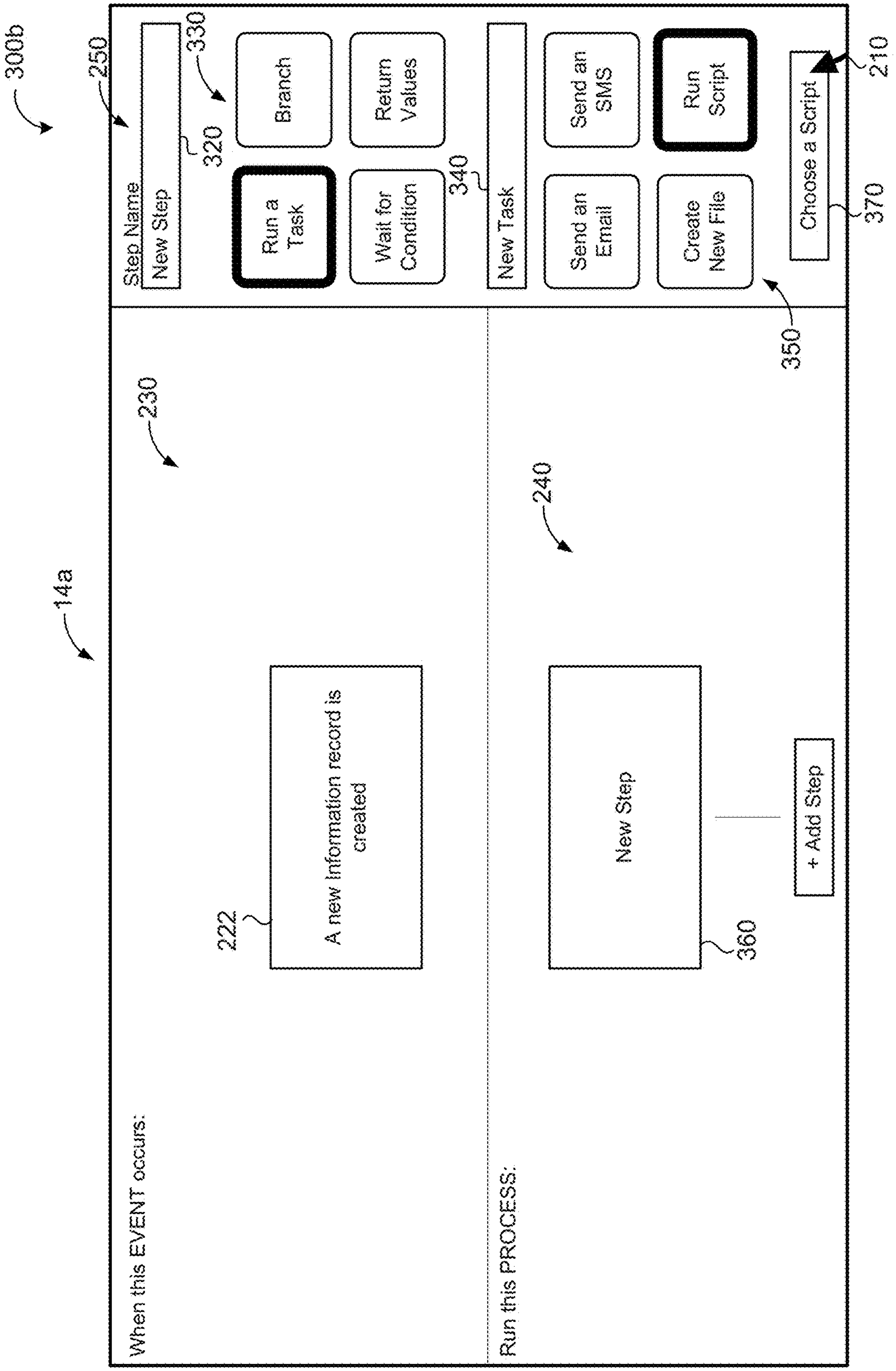

Referring now to FIG. 3B, while it is understood that the step options 330 and the task options 350 may include any number of choices and that the secure remote execution controller 150 may respond accordingly to whichever option the user 12*a* selects, in this example, the user 12*a*, after selecting the "Run a Task" step option 330, selects the "Run Script" step option 350. This prompts the GUI 14*a* to display a step identification element 360 and a select script indication 370. The select script indication 370, as discussed in more detail below, may query the low-code backend 180, the deployment backend 180, or any other service, using the API 650 (FIG. 6), for a list of scripts 162 available to the user 12*a*.

Figure 3C:
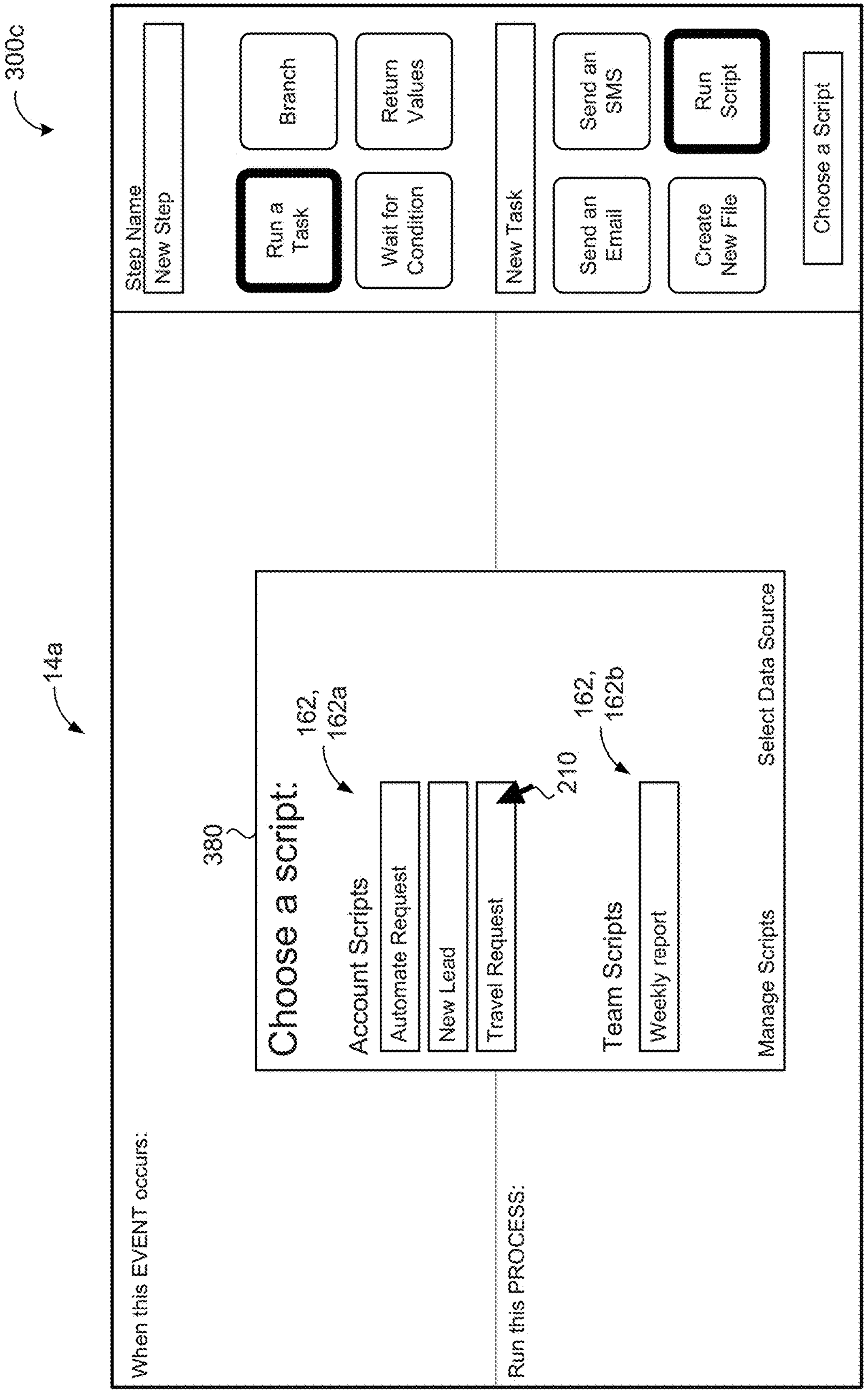

In this example, as shown in schematic view 300*b*, the user 12*a* generates a graphical user interaction (e.g., with the cursor 210) indicating a selection of the select script indication 370. In schematic view 300*c* (FIG. 3C), in response to receiving the user interaction indication indicating the user 12*a* selected the "Choose a Script" user input 360, the no-code frontend 161, using the GUI 14*a*, displays a script selection window 380 listing multiple different scripts 162 for the user 12*a* to select. Here, the scripts 162 have been split into two different categories: account scripts 162, 162*a* and team scripts 162, 162*b*. In this example, account scripts 162*a* represent scripts 162 associated specifically with an account of the user 12*a* while the team scripts 162*b* represent scripts 162 associated with a team of the user 12*a*. For example, another individual on the same team as the user 12*a* may publish a script 162 for an entire team that may appear under the team scripts 162*b*. Many other categorizations of the scripts 162 are possible. In this example, the user 12*a* selects, via the cursor 210, the account script 162*a* "Travel Request." Each script 162 may include a unique name or identifier.

Figure 4A:
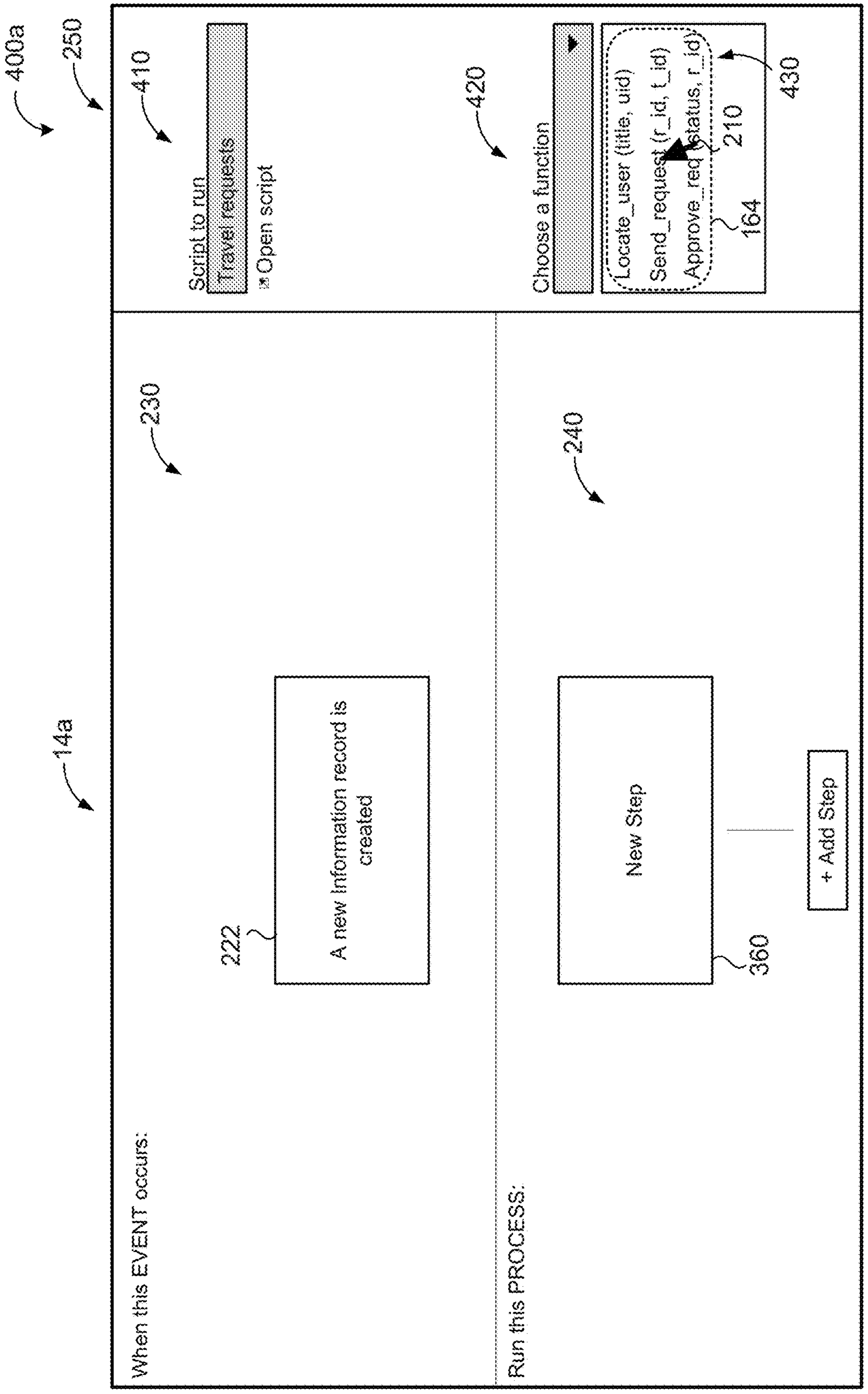
FIGS. 4A and 4B are schematic views of example user interactions for calling a function within the no-code environment.

Referring now to FIG. 4A, schematic view 400*a* includes the GUI 14*a* from the examples of FIG. 2A-3C. Here, after the user 12*a* selects the "Travel requests" script 162, the settings pane 250 updates to include selected script information 410. In this example, the selected script information 410 indicates a name of the script selected by the user 12*a* (FIG. 3C) and provides a link to access the script 162 (e.g., the source code of the selected script 162). The settings pane 250 also includes a function selection section 420 that, in this example, provides a drop-down list of each function 164 provided by the selected script 162 (e.g., retrieved via a query using the API 650 (FIG. 6)). Here, the "Travel requests" script 162 provides three functions 164: "Locate_user," "Send_request," and "Approve_req." In some examples, each function 164 is associated with one or more parameters 430. The no-code backend 160, after the user 12*a* selects a function 164, may receive, from the low-code backend 170 or the remote execution controller 150, one or more parameters 430 associated with the selected function 164. The remote execution controller 150, when executing the application 190, may call the function 164 (e.g., via a function call generated when the user 12*a* selects the function 164) using an evaluation of the expression for each respective parameter 430.

Here, the "Locate_user" function 164 is associated with parameters 430 "title" and "uid." Similarly, the function 164 "Send_request" is associated with the parameters 430 "r_id" and "t_id." The parameters 430 are values, variables, expressions, etc., that the associated function 164 requires as an input to execute. For example, a function 164 that sends an email may require as an input a first parameter 430 that provides an email address and a second parameter 430 that provides desired text of the email. In the illustrated example, the user 12*a* selects, via the cursor 210, the "Send_request" function 164 that is associated with parameters 430 "r_id" and "t_id."

Figure 4B:
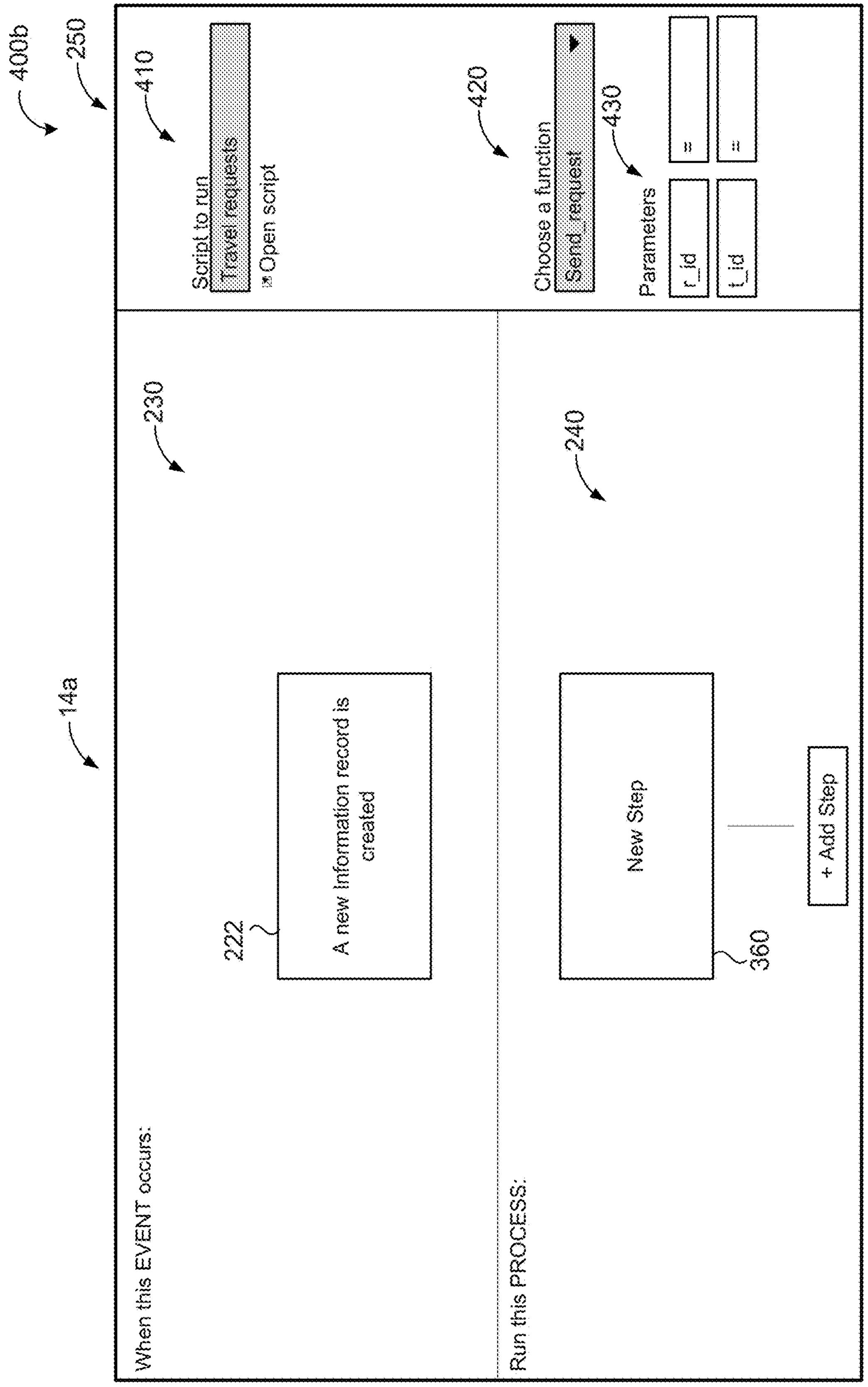

Referring now to FIG. 4B, in some implementations, for each respective parameter 430 associated with the selected function 164, the no-code backend 160 (e.g., via the GUI 14*a*) queries the user 12*a* for a value or an expression that, when evaluated, satisfies the respective parameter. Here, schematic view 400*b* includes the GUI 14*a* after the user 12*a* selects the "Send_request" function 164. The function selection section 420 may update to reflect the selected function 164 (e.g., by displaying a unique name associated with the function 164). In some implementations, the settings pane 250 includes a display of each parameter 430 associated with the selected function 164. The GUI 14*a* may include text boxes or other elements that allow for the user 12*a* to input values or variables for the application 190 to assign the parameters 430 when calling the function 164. Here, the function 164 "Send_request" includes parameters 430 "r_id" and "t_id" and the settings pane 250 accordingly includes a text box for each parameter 430 to accept user input.

In some implementations, the user 12*a* provides a constant value (e.g., a numerical value, a string, etc.) for one or more parameters 430. Optionally, the user 12*a* provides an expression or formula for one or more parameters 430. That is, the user 12*a* may provide an expression or formula for the application 190 to evaluate prior to calling the function 164. For example, the user 12*a* provides an expression that retrieves a value from a certain column and a certain row of a table and multiplies the retrieved value by a constant. The user 12*a* may differentiate between constants and expressions via a predetermined escape character such as an '=' symbol. The user 12*a*, in some examples, continues to interact with the GUI 14*a* to add additional trigger conditions 192 and/or action responses 194.

In some implementations, one or more parameters 430 are typed. The type may be implicitly inferred according to various heuristics or explicitly defined (e.g., by the user 12*b* via the low-code backend 170 or by the user 12*a* via the no-code backend 160). The typing may apply to the parameters 430 provided to the function 164 and/or any data returned from the function, such as a result 620 (FIG. 6). For example, the no-code backend 160 receives data type information from the low-code backend 170 for one or more of the parameters 430.

Referring back to FIG. 1, in some implementations, the application 190 is associated with a first set of permissions 196, 196*a*. Optionally, the first set of permissions is equal to or less than permissions associated with the user 12*a*. That is, the application 190 may only be granted permissions 196*a* (e.g., to access resources such as restricted data) that the author (i.e., the user 12*a*) is authorized to provide. For example, when the application 190 is configured to access a table stored at the data store 148 (e.g., the trigger condition 192 is satisfied when a row is added to the table), the application 190 must be authorized to access the table. The application 190 may inherit authorization from the user 12*a* (i.e., the user 12*a* authorizes the application 190 to access the table).

In some examples, when the action response 194 includes calling a script 162, the script 162 is associated with a second set of permissions 196, 196*b*. The second set of permissions 196*b* may be different from the first set of permissions 196*a*. For example, the function 164 called by the application 190 may require access to different data that requires different authorization to access. In some implementations, no-code backend 160, after the user 12*a* selects a function 164 for the application 190 to call, determines the second set of permissions 196*b*. For example, the no-code backend 160 evaluates the script 162 and/or function 164. As another example, the no-code backend 160 may query the low-code backend 170 or other service to determine the permissions 196 required for the selected function 164 to execute. After determining the second set of permissions 196*b*, the no-code backend 160 requests, from the user 12*a*, approval for the second set of permissions 196*b*.

Figure 5:
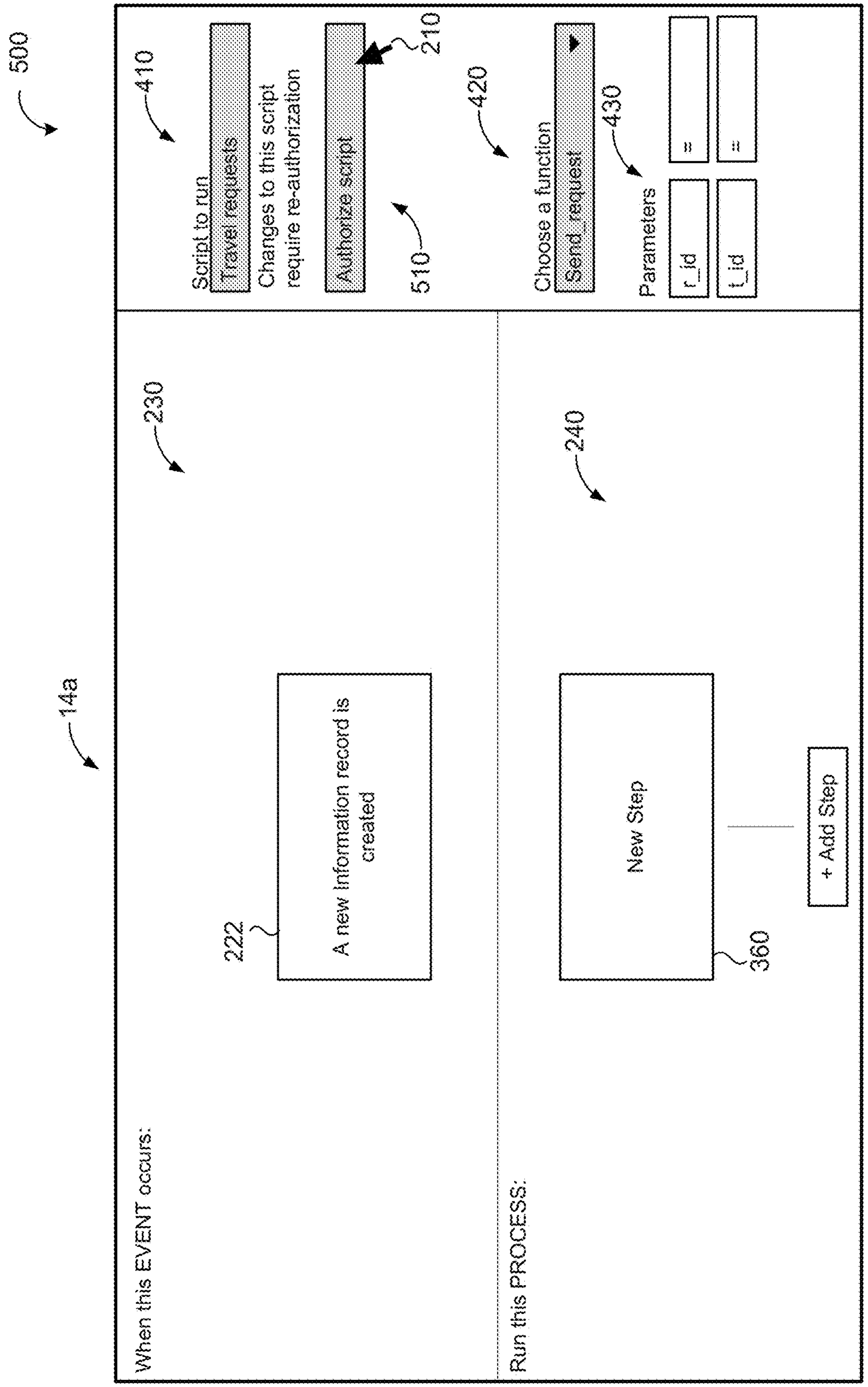
FIG. 5 is a schematic view of a user interaction to authorize permissions of a script within the no-code environment.

Referring now to FIG. 5, schematic view 500 includes the GUI 14*a* after the user 12*a* selects the "Send_request" function 164. Here, the GUI 14*a* includes an authorization user input 510. That is, in this example, the no-code backend 160 evaluates the "Send_request" function 164 of the "Travel requests" script 162 and determines that the function 164 requires some level of authorization to execute. The no-code backend 160 requires the user 12*a* to provide authorization for execution of the function 164 (e.g., via user interaction with the authorization user input 510 using cursor 210) prior to publishing or deploying the application 190. The user 12*a* must be capable of providing the necessary level of authorization to satisfy the permissions 196 required by the function 164. After the user 12*a* interacts with the authorization user input 510, the no-code backend 160 receives permissions approval approving the set of permissions 196 associated with the function 164. That is, in some examples, the script 162 must be authorized by the author of the application 190 (i.e., the user 12*a*) and not the author of the script 162 (i.e., the user 12*b*) or any user 12 executing the application 190.

In some examples, the no-code backend 160 stores credentials from the user 12*a* for providing authorization (e.g., via OAuth or other authentication standards) when calling the function 164 during execution of the application 190. The permissions 196*b* of the function 164 may be a subset of the permissions 196*a* of the application 190. The permissions 196 required by the function 164 may be dependent upon the values or expressions provided by the user 12*a* for the parameters 430 associated with the function 164 (e.g., based on the data required to be accessed to evaluate the expressions). In some implementations, the no-code backend 160 (e.g., via the GUI 14*a*) may require re-authorization when the required permissions 196 for the script 162 and/or function 164 change (e.g., in response to changing the values for the parameters 430). The GUI 14*a* may provide a list of authorizations needed for each selected function 164.

Referring back to FIG. 1, in some implementations, after the user 12*a* configures the application 190 (i.e., sets one or more trigger conditions 192 and one or more action responses 194), the user 12*a* may publish or deploy the application 190 using the deployment backend 180. The deployment backend 180 may execute the application 190 and expose the application 190 via an application deployment frontend 182 to a third user 12, 12*c*. The third user 12*c* may be the same or different from the first user 12*a* and/or the second user 12*b*. That is, the secure remote execution controller 150 may deploy the application 190 for a user 12 that is different than the user 12 that authored the application 190 and/or the user that authored the script 162. The third user 12*c*, for example, interacts with the application 190 via a third GUI 14, 14*c*. The user 12*c* may perform an action that satisfies the trigger condition 192. For example, when the trigger condition 192 includes adding a row to a table stored at the data store 148, the user 12*c* may submit a request via the GUI 14*c* that causes the application 190 (or a different application or service) to add a row to the table.

Referring now to FIG. 6, in some implementations, while the application 190 is executing, the application 190 determines whether the trigger condition 192 is satisfied (e.g., based on interactions from the third user 12*c*). When the trigger condition 192 is satisfied, the application 190 may call, using a function call 610, one or more functions 164 of a script 162. The function call 610 may include values for the parameters 430 associated with the function 164 called by the function call 610. The deployment backend 180 (or the low-code backend 170) upon receiving the function call 610, executes the function 164 using any included parameters 430. In some examples, prior to execution, the deployment backend 180 ensures the application 190 includes the proper authorization or permissions 196 to allow the function 164 to execute. The authorization may be included in the function call 610. In some examples, after executing, the function 164 returns a result 620 to the application 190. The result 620 includes, for example, an execution status 622 and/or a data response 624.

The execution status 622 indicates a status of the function execution. For example, the execution status 622 indicates to the application 190 whether the function 164 successfully executed or whether the function 164 encountered a failure while executing. The data response 624 may include any data the function 164 is configured to return to the application 190. For example, the function 164 queries a table for a value and returns the value to the application 190. The execution status 622 and/or the data response 624 may be typed. For example, the data response 624 is a structured data response that includes one or more fields and type information for at least one field of the one or more fields.

In some examples, receiving the result 620 satisfies another trigger condition 192 established by the application 190. In this situation, receiving the result 620 results in the application 190 executing another action response 194. The action response 194 may include the execution of any task or automation step. The execution status 622 and/or data response 624 may be passed to subsequent trigger conditions 192 and/or action responses 194 (e.g., tasks). The tasks may include updating data, sending emails or other notifications, or executing another function 164. That is, when the function 164 returns the result 620, the result may trigger the application 190 to call a second function 164. The application 190 may rely on the result 620 for any number of other trigger conditions 192 and/or action responses 194. For example, the application 190, after receiving the result 620, uses the received data response 624 as an input to another internal or external process or function. Put another way, the application 190, after receiving the result 620, may call another automation, such as another "if-this-then-than-that" process (as discussed above) based on or in response to receiving the result 620.

In some examples, the application 190 calls the function 164 via the API 650. The API 650 may serve as an interface between the application 190 and the script 162. The same or different API 650 may also interface the no-code environment 160, 161 and the low-code environment 170, 172. For example, the no-code backend 160 (e.g., when the user 12*a* is authoring the application 190) communicates with the low-code backend 170 via the API 650 to determine which scripts 162 the user 12*a* has access to, which functions 164 are available in each script 162, determine what, if any, permissions 196 are required to execute the functions 164, and/or to call the function 164 during execution of the application 190.

Thus, the secure remote execution controller 150 provides user-defined secure remote code execution from no-code platforms. Leveraging the capabilities of both no-code environments and low-code environments, users 12 can design applications 190 that satisfy a number of use cases. For example, applications 190 may automate emails by automatically sending customized messaging to internal or external (to the user's organization) users 12 for notifications and/or automated reports and/or list/mailmerge management. As another example, the applications 190 can create business artifacts by generating files with templated content. For instance, an application 190 can generate slides based on photographs added to a specified storage location. As yet another example, the applications 190 can provide connection between services to allow users 12 to use advanced features or enable integration with external products. The applications may run advanced business logic on specified data. For example, an application 190 saves all new email attachments to a specified location once per day.

Figure 7:
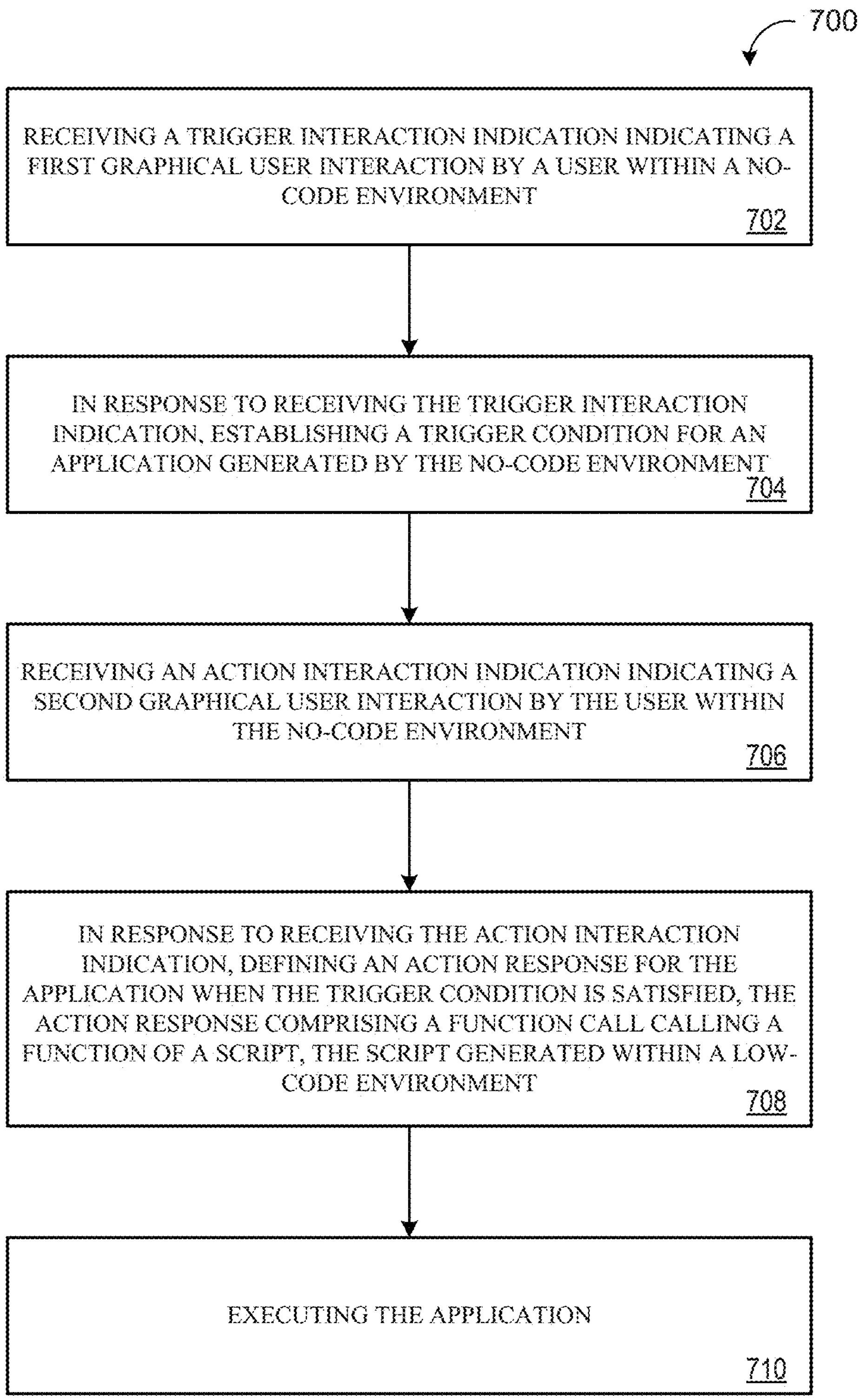
FIG. 7 is a flowchart providing an example arrangement of operations for a method of providing user-defined secure remote code execution from no-code platforms.

FIG. 7 is a flowchart of an exemplary arrangement of operations for a method 700 for providing user-defined secure remote code execution from no-code platforms. The method 700, at operation 702, includes receiving a trigger interaction indication 20 indicating a first graphical user interaction by a user 12*a* within a no-code environment 160, 161. At operation 704, the method 700 includes, in response to receiving the trigger interaction indication 20, establishing a trigger condition 192 for an application 190 generated by the no-code environment 160, 161. The method 700, at operation 706, includes receiving an action interaction indication 22 indicating a second graphical user interaction by the user 12*a* within the no-code environment 160, 161. At operation 708, the method 700 includes, in response to receiving the action interaction indication 22, defining an action response 194 for the application 190 when the trigger condition 192 is satisfied. The action response 194 includes a function call calling a function 164 of a script 162 generated within a low-code environment 170, 172. At operation 710, the method 700 includes executing the application 190.

Figure 8:
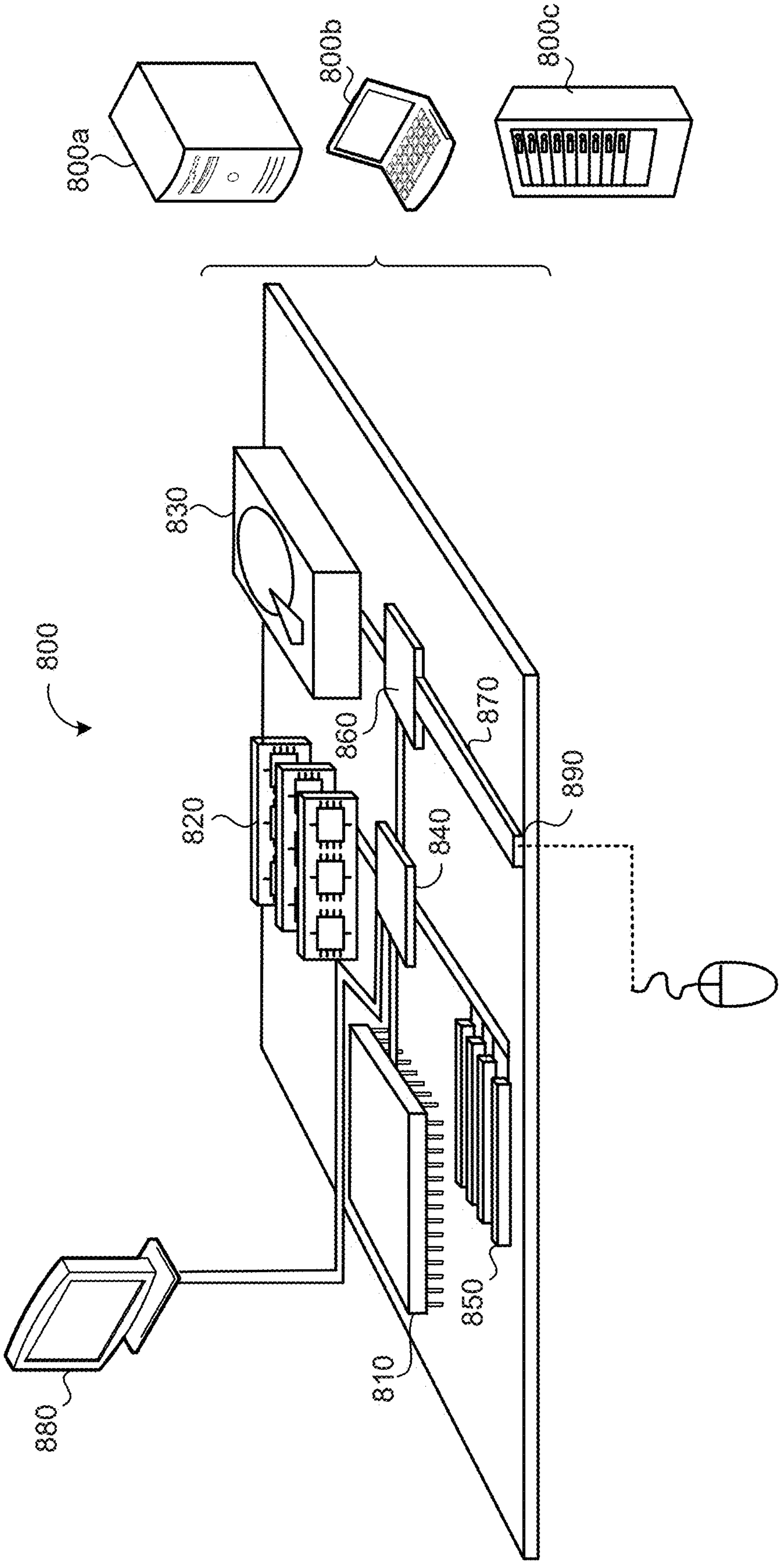
FIG. 8 is a schematic view of an example computing device that may be used to implement the systems and methods described herein.

FIG. 8 is a schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:

receiving, by data processing hardware, a trigger interaction indication indicating a first graphical user interaction by a user within a no-code environment;

in response to receiving the trigger interaction indication, establishing, by the data processing hardware, a trigger condition for an application generated by the no-code environment;

receiving, by the data processing hardware, an action interaction indication indicating a second graphical user interaction by the user within the no-code environment;

in response to receiving the action interaction indication, requesting, by the data processing hardware and from the user, a script selection indication;

receiving, by the data processing hardware, the script selection indication indicating selection of a script, the script comprising a plurality of functions;

in response to receiving the script selection indication, requesting, by the data processing hardware and from the user, a function selection indication;

receiving, by the data processing hardware, the function selection indication indicating selection selecting a function of the script from the plurality of functions, the function selection indication comprising a third graphical user interaction;

in response to receiving the function selection indication, defining, by the data processing hardware, an action response for the application when the trigger condition is satisfied, the action response comprising a function call calling the function of the script, the script generated within a low-code environment; and executing, by the data processing hardware, the application.

2. The method of claim 1, wherein each function of the plurality of functions is generated within the low-code environment.

3. The method of claim 1, further comprising, after receiving the function selection indication:

receiving, by the data processing hardware and from the low-code environment, one or more parameters associated with the function of the script;

receiving, by the data processing hardware and from the low-code environment, data type information for at least one of the one or more parameters; and for each respective parameter of the one or more parameters, querying, by the data processing hardware, the user for an expression that, when evaluated, satisfies the respective parameter.

4. The method of claim 3, wherein the function call calls the function of the script using an evaluation of the expression for each respective parameter.

5. The method of claim 1, wherein:

the application is associated with a first set of permissions;

the script is associated with a second set of permissions; and the second set of permissions is different than the first set of permissions.

6. The method of claim 5, further comprising:

determining, by the data processing hardware, the second set of permissions;

requesting, by the data processing hardware and from the user, approval for the second set of permissions; and receiving, by the data processing hardware and from the user, permissions approval approving the second set of permissions.

7. The method of claim 1, wherein, while the application is executing, the application:

determines whether the trigger condition has been satisfied;

responsive to determining that the trigger condition has been satisfied, calls, using the function call, the function of the script; and receives, from the function, a result comprising an execution status and a data response.

8. The method of claim 7, wherein the data response includes a structured data response comprising:

one or more fields; and type information for at least one field of the one or more fields.

9. The method of claim 7, wherein the application, based on the result, calls a second function of a second script.

10. The method of claim 7, wherein, while the application is executing, the application further uses the received data response as an input to a process.

11. The method of claim 1, wherein the application calls the function via an application programming interface (API).

12. The method of claim 1, wherein executing the application comprises deploying, by the data processing hardware, the application for a second user, the second user different than the user.

13. A system comprising:

data processing hardware; and memory hardware in communication with the data processing hardware, the memory hardware storing instructions that when executed on the data processing hardware cause the data processing hardware to:

receive a trigger interaction indication indicating a first graphical user interaction by a user within a no-code environment;

in response to receiving the trigger interaction indication, establish a trigger condition for an application generated by the no-code environment;

receive an action interaction indication indicating a second graphical user interaction by the user within the no-code environment;

in response to receiving the action interaction indication, request, from the user, a script selection indication;

receive the script selection indication indicating selection of a script, the script comprising a plurality of functions;

in response to receiving the script selection indication, request, from the user, a function selection indication;

receive the function selection indication indicating selection selecting a function of the script from the plurality of functions, the function selection indication comprising a third graphical user interaction;

in response to receiving the function selection indication, define an action response for the application when the trigger condition is satisfied, the action response comprising a function call calling the function of the script, the script generated within a low-code environment; and execute the application.

14. The system of claim 13, wherein each function of the plurality of functions is generated within the low-code environment.

15. The system of claim 13, wherein the instructions further cause the data processing hardware to, after receiving the function selection indication:

receive, from the low-code environment, one or more parameters associated with the function of the script;

receive, from the low-code environment, data type information for at least one of the one or more parameters; and for each respective parameter of the one or more parameters, query the user for an expression that, when evaluated, satisfies the respective parameter.

16. The system of claim 15, wherein the function call calls the function of the script using an evaluation of the expression for each respective parameter.

17. The system of claim 13, wherein:

the application is associated with a first set of permissions;

the script is associated with a second set of permissions; and the second set of permissions is different than the first set of permissions.

18. The system of claim 17, wherein the instructions further cause the data processing hardware to:

determine the second set of permissions;

request, from the user, approval for the second set of permissions; and receive, from the user, permissions approval approving the second set of permissions.

19. The system of claim 13, wherein, while the application is executing, the application:

determines whether the trigger condition has been satisfied;

responsive to determining that the trigger condition has been satisfied, calls, using the function call, the function of the script; and receives, from the function, a result comprising an execution status and a data response.

20. The system of claim 19, wherein the data response includes a structured data response comprising:

one or more fields; and type information for at least one field of the one or more fields.

21. The system of claim 19, wherein the application, based on the result, calls a second function of a second script.

22. The system of claim 19, wherein, while the application is executing, the application further uses the received data response as an input to a process.

23. The system of claim 13, wherein the application calls the function via an application programming interface (API).

24. The system of claim 13, wherein, to execute the application, the instructions cause the data processing hardware to deploy the application for a second user, the second user different than the user.

* * * * *